United States Patent
McCann et al.

(10) Patent No.: US 6,820,884 B2
(45) Date of Patent: Nov. 23, 2004

(54) INTEGRATED AXLE ADAPTOR AND SPRING SEAT FOR A VEHICLE SUSPENSION SYSTEM

(75) Inventors: Denis John McCann, Powys (GB); James A. E. Mills, Clwyd (GB); Richard Bellingham, Wrexham (GB); Peter Kerslake Gibbens, Newport (GB); Royston Leonard Morris, Newport (GB); Paul Roberts, Newport (GB); Paul Anthony Thomas, Newport (GB); Jonathan Leslie Christopher Jackson, Herefordshire (GB); Carl Edward Heinlein, Newport (GB)

(73) Assignee: Meritor Heavy Vehicle Braking Systems, Berks (GB)

( * ) Notice: Subject to any disclaimer, the term of this patent is extended or adjusted under 35 U.S.C. 154(b) by 0 days.

(21) Appl. No.: 10/228,156

(22) Filed: Aug. 26, 2002

(65) Prior Publication Data

US 2003/0042697 A1 Mar. 6, 2003

Related U.S. Application Data

(60) Provisional application No. 60/315,566, filed on Aug. 29, 2001.

(51) Int. Cl.[7] .................................................. B60G 9/02
(52) U.S. Cl. ........................ 280/124.157; 280/124.116
(58) Field of Search .................... 280/124.116, 124.157, 280/124.128

(56) References Cited

U.S. PATENT DOCUMENTS

| | | | |
|---|---|---|---|
| 1,369,028 A | * | 2/1921 | Herreshoff .................. 188/339 |
| 4,080,003 A | | 3/1978 | Boughton |
| 4,114,923 A | * | 9/1978 | Raidel ................. 280/124.116 |
| 4,445,597 A | | 5/1984 | Baltare |
| 4,858,730 A | | 8/1989 | Baroni |
| 5,253,737 A | | 10/1993 | Klaue |
| 5,921,570 A | * | 7/1999 | Lie ..................... 280/124.175 |
| 5,950,971 A | * | 9/1999 | Koumbis et al. ........... 248/200 |
| 6,237,926 B1 | * | 5/2001 | Pritchard et al. ..... 280/124.128 |
| 6,240,806 B1 | * | 6/2001 | Morris et al. ................. 74/567 |
| 6,279,695 B1 | | 8/2001 | Davison |
| 6,439,353 B2 | | 8/2002 | Roloff et al. |
| 2003/0067134 A1 | * | 4/2003 | Galazin ............... 280/124.116 |

FOREIGN PATENT DOCUMENTS

| | | |
|---|---|---|
| DE | 4036272 A1 | 5/1992 |
| DE | 19857074 A1 | 6/2000 |
| EP | 0 863 060 A2 * | 9/1998 |
| EP | 0906856 A2 | 4/1999 |
| EP | 1 052 123 A1 | 11/2000 |
| EP | 1293405 A2 | 3/2003 |
| FR | 1084119 | 1/1955 |
| WO | WO 00/46052 * | 8/2000 |

OTHER PUBLICATIONS

European Search Report, Dec. 19, 2003.

* cited by examiner

*Primary Examiner*—Ruth Ilan
(74) *Attorney, Agent, or Firm*—Carlson, Gaskey & Olds

(57) ABSTRACT

A vehicle suspension assembly includes a device for securing an axle to a selected suspension component. A seat member that is received between the axle and the suspension component includes an axle adaptor as part of the seat member. A first portion of the seat member is received between the axle and the suspension component. A second portion of the seat member extends away from the first portion and includes at least one support surface for supporting a brake component relative to the axle. In one example embodiment, the seat member includes an integrated brake carrier.

18 Claims, 2 Drawing Sheets

INTEGRATED AXLE ADAPTOR AND SPRING SEAT FOR A VEHICLE SUSPENSION SYSTEM

CROSS REFERENCE TO RELATED APPLICATIONS

This application claims priority to Provisional Application No. 60/315,566, which was filed on Aug. 29, 2001.

BACKGROUND OF THE INVENTION

This invention generally relates to vehicle suspension systems. More particularly, this invention relates to an integrated axle adaptor and spring seat for vehicle suspension systems.

Commercial vehicle trailer axles typically include a simple beam axle that is effectively hung from the trailer chassis by leaf springs, for example, as part of a suspension arrangement to damp the vibration effects while the vehicle is in motion over a road surface. FIG. 5 schematically shows a conventional arrangement where a support portion 11 is associated with the trailer chassis. A conventional air spring 12 provides a means of suspension in a conventional manner. A suspension component 13 such as a support arm or leaf springs, depending on the particular vehicle, is secured at one end to the support 11 and associated with the air spring 12 as known. An axle 14 is secured in position relative to the suspension component 13 using a conventional spring seat 15 and plate 16. A pair of U-bolts 17 secure the axle, spring seat and plate in place on the suspension component 13. A separate axle adaptor 18 is secured to the axle 14 using a conventional welding technique.

The axle adaptor 18 provides a fixed base to which the brake torque associated with the operation of brake components can be transmitted. It is common to have a separate brake carrier secured to the axle adaptor and then to have braking components supported by the brake carrier. Assembling all of these components requires time and introduces additional space considerations and materials. Each of these presents drawbacks that ideally would be minimized.

Another drawback is that welding an axle adaptor to an axle has several complications and potential problems. One difficulty is that the welding process tends to distort the adaptor. Any distortion requires subsequent machining to ensure that the axle adaptor will appropriately support a brake carrier and other components. If the brake components cannot be squarely mounted to the adaptor and axle, for example, the system may not operate as desired.

Another drawback associated with welding the adaptor to the axle is that it introduces the possibility for weaknesses within the axle structure. It is known that axles are more likely to crack at weld locations because of the common change in the strength of the axle material adjacent to the weld. Appropriately placing the weld on an area of relatively low stress, near the neutral axis of the axle beam for example, tends to minimize the effects of such welds, but does not eliminate the issue.

Another approach has been to attempt to bolt the axle adaptor to the axle. A separate mounting flange on the axle is then required. Again, there are issues associated with securing the mounting flange to the axle. Additionally, a mounting flange introduces extra weight, cost and materials. Further, the fixing bolts required to attach the pieces together introduces further components and labor, reducing the economies of the assembly.

This invention addresses the need for economically and securely supporting brake components relative to an axle while avoiding the shortcomings and drawbacks of the prior art.

SUMMARY OF THE INVENTION

In general terms, this invention is a suspension assembly having an integrated axle adaptor and spring seat.

In one example assembly designed according to this invention, a seat member includes a first portion that is adapted to be at least partially received between the axle and a corresponding suspension component. A second portion of the seat member extends from the first portion and has at least one support surface that is adapted to support a brake component relative to the axle.

The seat member preferably comprises a single piece of metal so that the spring seat function and the adaptor function are performed by the same component. Having an integrally formed, single-piece component simplifies the assembly process, minimizes parts and labor and maximizes the economies of the assembly.

In one example, the second portion of the seat member is a combined axle adaptor and brake carrier so that it includes surfaces adapted to support the actual braking components and a separate brake carrier is not required. In one example, the seat member provides an inboard abutment surface for the brake components and an outboard abutment surface is selectively secured to the second portion of the seat member.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
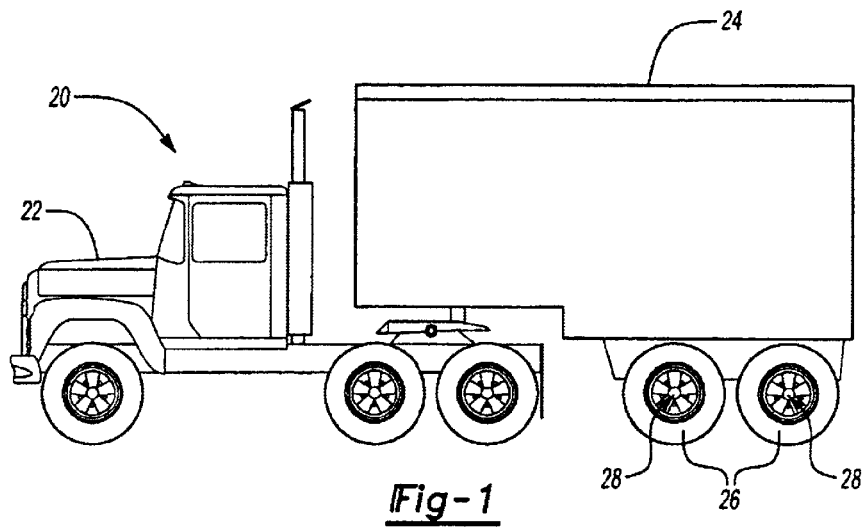
FIG. 1 schematically illustrates a vehicle with which an assembly designed according to this invention can be used.

FIG. 1 schematically shows a vehicle 20 having a cab portion 22 and a trailer portion 24. Such commercial vehicles are well known. A plurality of wheels 26 are associated with the trailer portion 24 and suspended from the trailer chassis in a generally known manner so that the wheels 26 rotate about the axes 28.

This invention provides a unique suspension assembly that integrates the features of several components into one, which reduces parts, material, labor costs and manufacturing steps required to provide a reliable suspension and braking arrangement.

Figure 2:
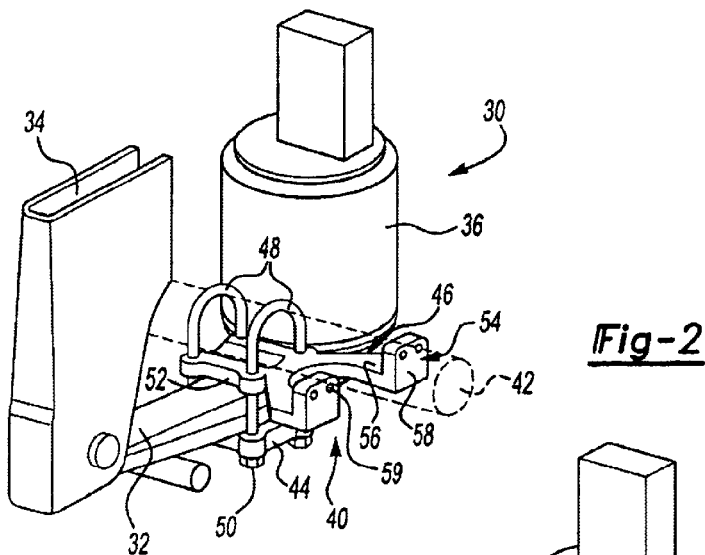
FIG. 2 schematically illustrates a first example assembly designed according to this invention.

A first example assembly 30 designed according to this invention is shown in FIG. 2 where a suspension component 32 such as a suspension arm or leaf springs, depending on the particular arrangement, is associated with a support bracket 34. An air spring 36 and a support bracket 34 provide the connection with and suspension relative to the trailer portion 24 in a known manner.

The inventive device 40 secures the axle 42 (shown in phantom for clarity) to the suspension component 32. A plate member 44 is received on one side of the suspension component 32 and a seat member 46 is received between the axle 42 and the suspension component 32. A pair of U-bolts 48 and a corresponding number of nuts 50 secure the plate member 44, the seat member 46 and the axle 42 in place relative to the suspension component 32. Although not illustrated, a top plate may be received against the other side of the axle 42 to avoid introducing any stress on the axle 42 in the area where the axle is held in place by the device 40.

The seat member 46 includes a first portion 52 that is received between the suspension component 32 and the axle 42. In the illustrated example, the axle 42 has a rounded exterior and the first portion 52 of the seat member 46 has a corresponding contour to best receive the axle 42. Generally rectangular axle arrangements are useful with an assembly designed according to this invention and those skilled in the art who have the benefit of this description will make the appropriate changes to the illustrated example to accommodate such an axle.

A second portion 54 of the seat member 46 extends outwardly away from the first portion 52. In the illustrated example, two extensions 56 extend in a direction generally parallel with the body of the first portion 52, which is generally parallel to the axis of the axle 42. A support surface 58 is located at a distal end of each extension 56. The support surface 58 is adapted to support the appropriate brake components of the brake assembly (not illustrated). In the example of FIG. 2 holes 59 are provided on the support surfaces 58 to accommodate bolts for securing the appropriate brake components in place.

Figure 3:
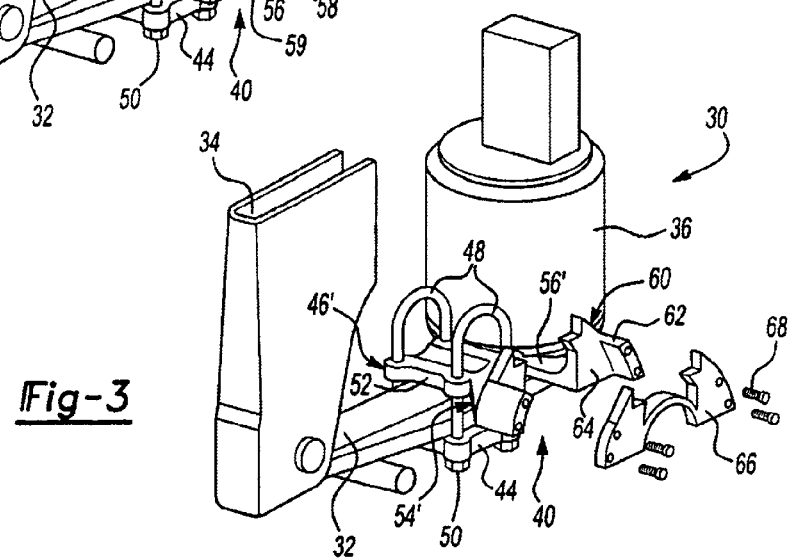
FIG. 3 schematically illustrates another example assembly designed according to this invention.

The example of FIG. 3 includes a modified seat member 46' having a second portion 54' that functions as a dual axle adaptor and brake carrier. The second portion 54' includes extensions 56' similar to those of the examples of FIG. 2. The distal ends of the extensions 56' include brake carrier structures 60 having a containing portion 62 and an inboard abutment surface 64. An outboard abutment member 66 is selectively secured to the containment portions 62 using bolts 68 in the illustrated example.

The example of FIG. 3 is particularly well suited for a disc brake arrangement. Other brake carrier configurations that are integrated with a spring seat are within the scope of this invention. Those skilled in the art who have the benefit of this description will be able to customize the shape or dimensions of a brake carrier designed according to this invention to meet the needs of their particular situation.

Figure 4:
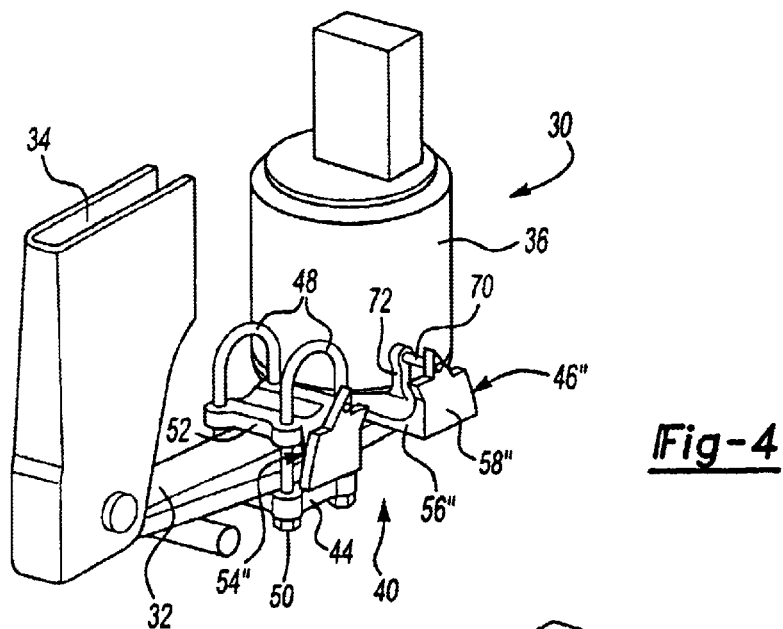
FIG. 4 schematically illustrates yet another example assembly designed according to this invention.
Figure 5:
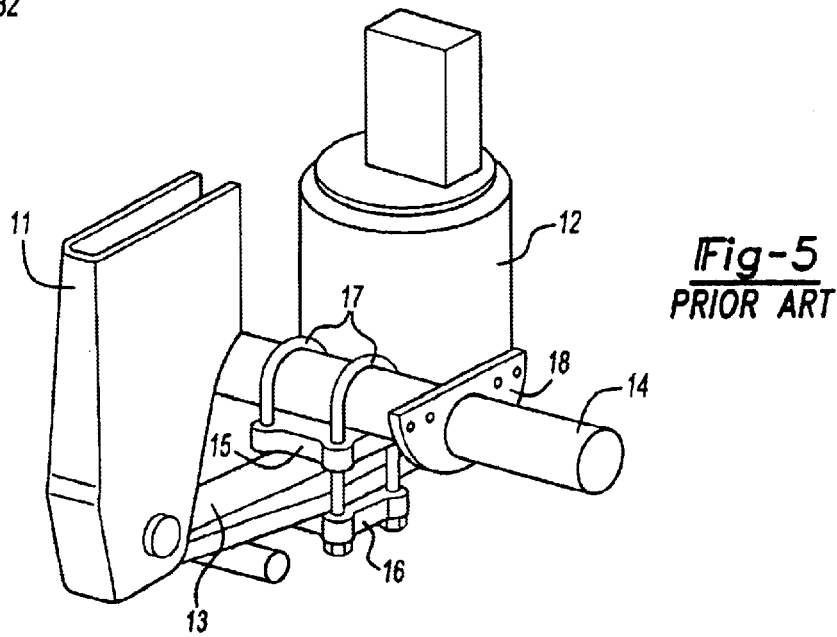
FIG. 5 schematically illustrates selected components of a prior art suspension assembly.

FIG. 4 shows another example assembly where the second portion 54" of the seat member 46" includes a guide sleeve 70 extending between the support surface 58" and an additional support portion 72, which extends between the guide sleeve 70 and the corresponding extension 56".

The inventive arrangement provides a stable brake mounting structure without requiring a separate attachment directly to the axle. The inventive approach utilizes the connection between the axle, the spring seat and the suspension component to provide the stable mounting arrangement. This invention avoids the problems of weld distortion associated with conventional attachment techniques and eliminates the need for subsequent machining, which enhances the economies of the overall assembly. By reducing the number of components and the overall axle mass, this invention provides further economical advantages.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An assembly for securing an axle relative to at least one suspension component, comprising:
    a seat member having a first portion that is adapted to be at least partially received between the axle and the suspension component and a second portion extending from the first portion having at least one support surface that is adapted to support a brake component relative to the axle wherein the seat member second portion comprises two extensions to be aligned generally parallel to an axis of the axle and wherein the support surface comprises two plate portions, each extending generally perpendicularly away from a distal end of the extensions.

2. The assembly of claim 1, wherein the seat member comprises a single piece of metal.

3. The assembly of claim 1, wherein the seat member second portion comprises at least one opening adapted to receive a bolt for securing the brake component to the second portion.

4. The assembly of claim 1, wherein the seat member second portion comprises a brake carrier having a surface that is adapted to cooperate with the brake component to maintain the brake component in a desired position.

5. The assembly of claim 4, including a first abutment surface, a second abutment surface and a containment surface for collectively maintaining the brake components in the desired positions.

6. The assembly of claim 4, wherein the seat member second portion comprises an inboard brake abutment and including an outboard abutment adapted to be secured to the inboard brake abutment.

7. The assembly of claim 1, including a plate member that is adapted to be received against a side of the axle opposite the seat member and a securing device for selectively securing the plate member and the seat member to the suspension component and the axle.

8. The assembly of claim 7, wherein the securing device comprises two U-bolts and a plurality of nuts.

9. The assembly of claim 1, wherein the seat member second portion includes a guide sleeve inboard of the support surface.

10. A vehicle suspension assembly, comprising:
    a support adapted to be secured to a selected portion of a vehicle;
    a suspension component associated with the support;
    an axle secured to the suspension component such that the axle is suspended from the selected portion of the vehicle; and
    a seat member having a first portion that is at least partially received between the axle and the suspension component and a second portion extending from the first portion having at least one support surface that is adapted to support a brake assembly component relative to the axle wherein the seat member second portion comprises two extensions aligned generally parallel to an axis of the axle and wherein the support surface comprises two plate portions, each extending generally perpendicularly away from a distal end of the extensions.

11. The assembly of claim 10, wherein the seat member comprises a single piece of metal.

12. The assembly of claim 10, wherein the seat member second portion at least partially surrounds a section of a periphery of the axle.

13. The assembly of claim 10, wherein the seat member second portion comprises a brake carrier having a surface that is adapted to cooperate with the brake component to maintain the brake component in a desired position.

14. The assembly of claim 13, including a brake shoe supported on the brake carrier.

15. The assembly of claim 13, wherein the second portion of the seat member comprises an inboard brake abutment and including an outboard abutment adapted to be secured to the inboard abutment.

16. The assembly of claim 10, including a plate member that is adapted to be received against a side of the axle opposite the seat member and a securing device for selectively securing the plate member, the seat member, the suspension component and the axle together.

17. The assembly of claim 16, wherein the securing device comprises two U-bolts and a plurality of nuts.

18. The assembly of claim 10, wherein the seat member second portion includes a guide sleeve inboard of the support surface.

* * * * *

UNITED STATES PATENT AND TRADEMARK OFFICE
CERTIFICATE OF CORRECTION

PATENT NO. : 6,820,884 B2
DATED : November 23, 2004
INVENTOR(S) : McCann et al.

It is certified that error appears in the above-identified patent and that said Letters Patent is hereby corrected as shown below:

Column 4,
Line 34, "axle" should read as -- suspension component --.

Column 5,
Line 10, "axle" should read as -- suspension component --.

Signed and Sealed this

First Day of March, 2005

JON W. DUDAS
*Director of the United States Patent and Trademark Office*